B. J. TAYMAN,
Assignor, by mesne assignments, to G. H. P. FLAGG.
Machine for Trimming the Soles of Boots and Shoes.
No. 9,073. Reissued Feb. 10, 1880.
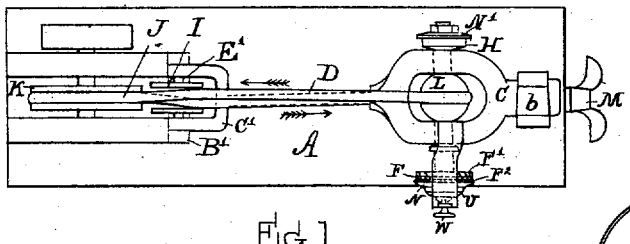
Fig. 1.
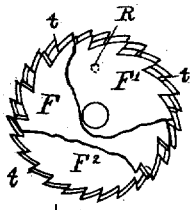
Fig. 12.
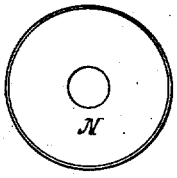
Fig. 14.
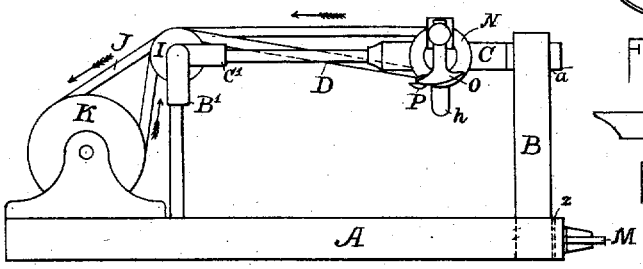
Fig. 2.
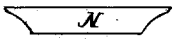
Fig. 13.
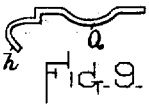
Fig. 9.
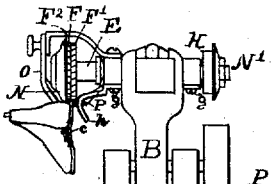
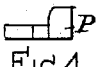
Fig. 4.
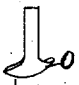
Fig. 7.
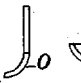
Fig. 8.
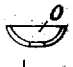
Fig. 8.
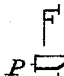
Fig. 5.
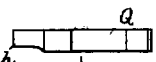
Fig. 10.
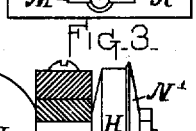
Fig. 3.
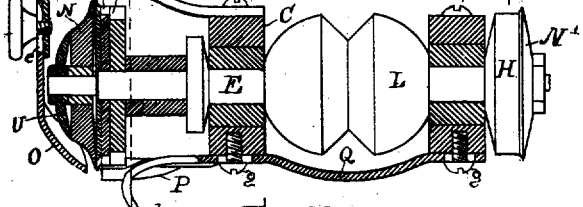
Fig. 11.
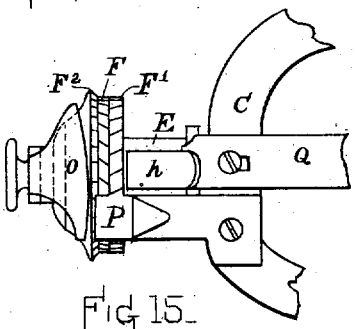
Fig. 15.
Wm. Pittel
J. R. Snow.
Benjamin J. Tayman
by J. R. Maynadier
his atty
THE NORRIS PETERS CO., PHOTO-LITHO., WASHINGTON, D. C.

UNITED STATES PATENT OFFICE.

BENJAMIN J. TAYMAN, OF PHILADELPHIA, PENNSYLVANIA, ASSIGNOR, BY MESNE ASSIGNMENTS, TO GEORGE H. P. FLAGG.

MACHINE FOR TRIMMING THE SOLES OF BOOTS AND SHOES.

SPECIFICATION forming part of Reissued Letters Patent No. 9,073, dated February 10, 1880.

Original No. 136,790, dated March 11, 1873. Application for Reissue filed December 8, 1879.

*To all whom it may concern:*

Be it known that I, BENJAMIN J. TAYMAN, of the city of Philadelphia and State of Pennsylvania, have invented certain Improvements in Machines for Trimming Shoe Soles and Welts and Burnishing the Soles, of which the following is a specification.

My machine is provided with a revolving shaft having cutters for trimming the edges of shoe soles and welts and a wheel for burnishing the edges of the soles. The shaft is held securely in either a horizontal or vertical position to suit the work to be done, and is capable of being changed from one position to the other while running, thus preventing loss of time in the adjustment.

My invention consists in a novel form of cutting-edge for rotary edge-trimming tools; also, in a rotary welt-trimmer for taking off the corner of the sole next the upper; also, in the combination, with a sole-edge-finishing tool, of a rest for the edge of the sole, to enable the operator to steady the shoe and hold it more firmly, especially when finishing the edge about the toe; and also in the combination, with a sole-edge-finishing tool, of a finger-rest to aid the operator in holding the shoe under the action of the tool; and in the combination of a rotary cutter for both trimming the sole-edge and taking off the corner of the sole next the upper, with certain of the other elements above named.

The peculiar construction of the machine is hereinafter fully described.

Figure 1 is a plan view of the machine. Fig. 2 is a side elevation of the same. Fig. 3 is an end elevation, in which a shoe is seen in position for the trimming of the sole and welt. Figs. 4 and 5 are top and edge views of the rest P. Figs. 6, 7, and 8 are top, side, and edge views of the guide O. Figs. 9 and 10 are top and edge views of the finger-support Q. Fig. 11 is a side view of the shaft E, having on one end cutters F and F′ for trimming the edge of the sole, a cutter, $F^2$, for trimming the welt, and a circular guide, N, and on the other end a burnisher, H, and a guide, N′. Fig. 12 is a cross-section of the shaft E at the dotted line *a b* of Fig. 11. Figs. 13 and 14 are edge and face views of the guide N. Fig. 15 is an under-side view, showing the relative arrangement of the rest, finger-support, and cutters.

Like letters in all the figures indicate the same parts.

A is the bed-plate, which has an upright, B, at its front end, provided with a seat, *a*, in which the square part *b* of the swivel C is supported. The swivel C is connected to the swivel C′, by means of the rod D, by a screw-connection, so as to admit of their turning freely thereon. The swivel C is provided with a revolving shaft, E, carrying on one end circular cutters F and F′ for trimming the edge of the sole, and a like cutter, $F^2$, for trimming the welt, and a circular burnisher, H, and guide N′ on the other end. The cutting-edges of the teeth *t* of the cutters F and F′ have a forward inclination toward the outer faces of the cutters, for the purpose of producing an inwardly-drawing cut to prevent leaving a feather-edge on the corners of the edge of the sole, and it is in order to produce this V-shaped cutting-edge that the cutters F F′ are made separate. The cutter F is thinner than the thinnest sole of shoes, to always insure the combined action of both cutters, thus preventing the formation of a feather-edge on the outer corner of the sole. The outer cutter, F′, is sufficiently thick to project over the thickest sole, and thus secure a clean cut. The cutter $F^2$ has its cutting-edges inclined toward its axis, so that it will take off the corner of the sole next the upper, and thus trim the welt, the cutter in my machine trimming both the edge and the welt. The swivel C′ is provided with a revolving shaft, E′, whose journals are supported by the forked upright B′. On the shaft is a double pulley, I, with which is connected the band J, which connects also with the driving grooved wheel K and the pulley L on the shaft E, for revolving the cutters F, F′, and $F^2$ and burnisher H. The upright B is adjusted so as to elevate or depress the swivel C by means of a vertical slot, *z*, in the bed-plate and the tightening-screw M.

N is a circular guide on the shaft E. It turns loosely on the shaft, so as to roll in the depression *c* formed by the junction of the sole and upper of the shoe, as seen in Fig. 3, to prevent friction and consequent injury to the leather.

N′ is a loose guide in combination with the burnisher H. In connection with said guide N there is a gage, O, (seen in detail in Figs. 6, 7, and 8,) which presses lightly upon the upper, to assist in keeping the shoe in its normal position while the sole is being trimmed, and to prevent said guide N cutting the stitches or injuring the upper. It is connected with the stationary plate O′, the inner end of which is secured to the swivel C. The guide has a vertical adjustment by means of the connection of the shank *d* with the groove *e* in the front end of the plate O′.

P is a rest, (shown in detail in Figs. 4 and 5,) which is fastened by means of a screw to the swivel C. The object of this rest is to prevent the cutter throwing the shoe out of its proper position when short curves of the sole are brought against the cutters.

Q is a finger-support, (seen in detail in Figs. 9 and 10,) which is secured to the swivel C by means of screws *g g*. It has on its front end a curved projection, *h*, on which the operator places a finger to steady his hand in holding the shoe and changing its position.

Operation: The shoe is held up against the guides N and O and rest P by the operator, and turned around to bring the edge of the sole against the cutters F and F′ as they revolve in the direction of the arrows, by means of the band J, driving-wheel K, and pulleys I and L, whereby the edge of the sole is trimmed, the welt being trimmed at the same time by means of the cutter $F^2$. When the edge of the sole is to be burnished the square part *b* of the swivel C is raised out of its seat *a*, and the head is turned one-fourth round, so as to bring the shaft vertical and with the burnisher H on its upper end. The part *b* is then connected with the seat *a*, for holding the shaft securely in position. The changing of the shaft from one position to the other may be made while it is running.

By removing the devices for trimming and burnishing shoe-soles the machine may be used for dovetailing and like purposes by the connection of suitable cutters with the shaft E.

What I claim as my invention is—

1. A rotary cutter, F F′, having angular cutting-edges to produce drawing cuts toward the middle of the edge of the sole, substantially as described.

2. A rotary welt-cutter, $F^2$, having cutting-edges inclined toward its axis and adapted to take off the corner of the sole near the upper, substantially as described.

3. In combination, the sole-edge-finishing tool and the rest P, substantially as described.

4. In combination, the sole-edge-finishing tool and the finger-support Q, substantially as described.

5. The rotary cutter F F′ $F^2$, adapted to trim both the edge and the welt, substantially as described.

6. In combination, the rotary cutters F F′ $F^2$, adapted to trim both the edge and the welt, and the rand-guide N.

BENJ. J. TAYMAN.

Witnesses:
ANDREW ZANE, Jr.,
JNO. H. SCHAEFFER.